United States Patent [19]

Sasahara et al.

[11] Patent Number: 5,091,974
[45] Date of Patent: Feb. 25, 1992

[54] METHOD OF PROCESSING LINEWORK WITH ELECTRONIC IMAGE PROCESSOR

[75] Inventors: Masayuki Sasahara; Katsuya Yamaguchi, both of Kyoto, Japan

[73] Assignee: Dainippon Screen Mfg. Co., Ltd., Kyoto, Japan

[21] Appl. No.: 515,011

[22] Filed: Apr. 26, 1990

[30] Foreign Application Priority Data

May 12, 1989 [JP] Japan .................................. 1-119055

[51] Int. Cl.$^5$ .............................................. G06K 9/44
[52] U.S. Cl. ........................................ 582/55; 382/56
[58] Field of Search ....................... 382/55, 56; 358/75, 358/77, 78, 80

[56] References Cited

U.S. PATENT DOCUMENTS 4,847,689 7/1989 Yamamoto et al. ................... 358/80
4,922,332 5/1990 Taniguchi et al. .................... 358/75

FOREIGN PATENT DOCUMENTS 1-32547 7/1989 Japan .

OTHER PUBLICATIONS

Agui et al., "Labeling," Computer Animation, Chaper 7, pp. 76-79 (Sampo-Syuppan Co., Ltd., Tokyo, Japan, 1983).

Primary Examiner—Michael Razavi
Assistant Examiner—Jose L. Couso
Attorney, Agent, or Firm—Lowe, Price, LeBlanc & Becker

[57] ABSTRACT

An original image is represented in a run-length format. Run-length of each image region is compared with a predetermined reference value, and if the former is smaller than the latter, the run-length (l) is divided into two values ($l_1$, $l_2$). The two values are added to the run-length of image regions adjacent thereto, respectively. As a result, a linework (R1) included in the original image is erased without leaving a blank on the erased area.

11 Claims, 12 Drawing Sheets

FIG. 6B $l_A, l_B, l_C$: DIVIDED RUN-LENGTH VALUES

FIG. 7A

FIG. 7B $l_P, l_F$ : ADDITIVE RUN-LENGTH VALUES

METHOD OF PROCESSING LINEWORK WITH ELECTRONIC IMAGE PROCESSOR

BACKGROUND OF THE INVENTION

1. Field of the Invention

The present invention relates to a method of processing a linework which is photoelectrically read with an image reader, and more particularly, it relates to a method of erasing, thickening, or thinning borderlines such as ruled lines.

2. Description of the Prior Art

As is well known, there is such a conventional apparatus widely being made available, which electrically reads an original image containing a drawn linework with an image input device such as a monochromatic scanner, and then generates image data to fill the closed regions formed by the linework with designated colors. The image data thus obtained are used in a process work for printing and a computer graphic for providing designated colors to respective regions.

Figure 8:
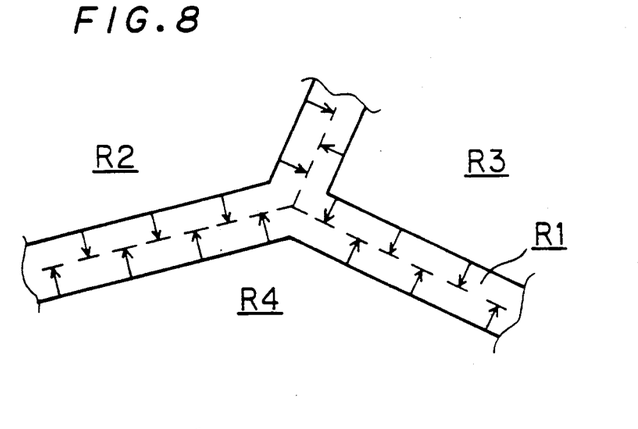
FIG. 8 illustrates borderlines.

After completing the process of generating an image in which respective regions are filled with colors, these borderlines are no longer necessary and the same should be erased. A variety of prior arts have proposed methods of erasing borderlines. In these prior arts, regions R2 through R4 (FIG. 8) located on both sides of a borderline region R1, for example, are extended toward the region R1 so that these regions R2 through R4 come to contact with each other at the center of the region R1. The image thus obtained is satisfactory in visual impression thereof.

Figure 9:
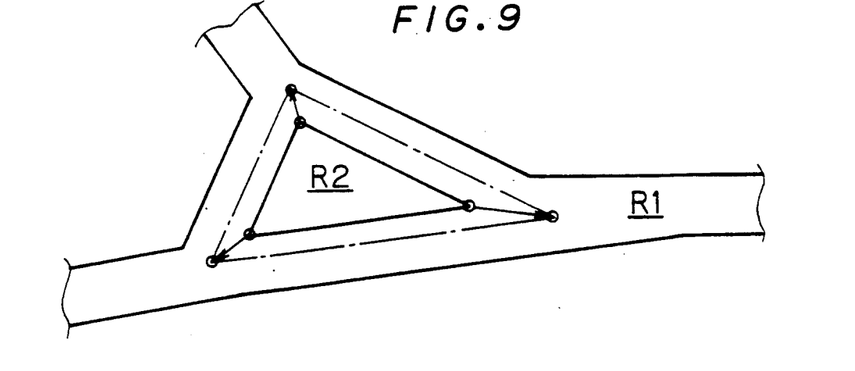
FIG. 9 illustrates a conventional linework processing.

For example, as shown in FIG. 9, one of these prior arts employs a computer in order to trace the respective pixels on the circumferential line of the region R2, and then to extend the circumferential line up to the center of the borderline region R1. Then, the inner half of the triangle portion in the region R1 is replaced with the color of the extended portion of the region R2. The respective regions are subjected to the expansion and the color-replacement process, so that the respective borderlines are erased and the colors of the adjacent regions are given thereto. This prior art automated the manual operation, having been executed by process workers.

If an original image is too large or the same is represented at a high resolution, however, the number of the pixels included therein is large. In such a case, therefore, a very long time is needed for detecting closed loops and connection relationship between all the lineworks, and the processing cost also increases. For example, the above prior art is effective for processing small lineworks having a resolution of about 10 lines per millimeter and a maximum of several thousands of pixels in each direction on an image plane. Nethertheless, this prior art needs to spend a very long time when an object image includes a large linework having tens of thousands of pixels in each direction and tens of lines per millimeter in resolution, and thus, this prior art is not suitable for practical use.

Figure 10:
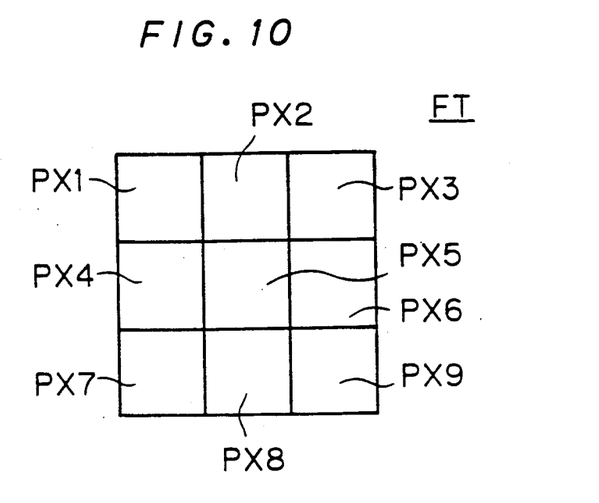
FIG. 10 illustrates a spatial filter.

There is another prior art in which a spatial filter having 3×3 components shown in FIG. 10, for example, is serially applied to the contact area of a borderline region and other regions. If the borderline region is located in the nine pixels PX1-PX9 of the spatial filter, the color of the corresponding region is replaced by the color of the adjacent region. Even when applying the prior art, it requires a long time for processing the linework having a high resolution and a large size.

As mentioned above, if the original image has a high resolution and too many pixels, any of those conventional arts needs to spend a very long time for processing the linework. This in turn results in the increased cost.

In particular, these problems become further serious as the resolution and the number of pixels included in lineworks are further increased in order to improve the reproduction accuracy and the image quality in an electronic process for printing.

SUMMARY OF THE INVENTION

The present invention is directed to a method of converting an image which has image regions corresponding to respective parts of a linework.

According to the present invention, the method comprises the steps of: (a) defining a first parallel array of processing lines on the image; (b) detecting respective length of the image regions on each of the processing lines belonging to the first parallel array; (c) comparing the respective length with a predetermined reference value to find an objective image region whose length is smaller than the reference value on at least one processing line belonging to the first parallel array; and (d) on the at least one processing line, shifting boundaries between the objective image region and image regions adjacent to the objective image region to thereby obtain a converted image.

In particular, the present invention is effective in changing a width of a linework which is included in an original image. The width of the linework has a non-zero value, and the method comprises the steps of: (a) defining a first parallel array of processing lines on the original image each of which extends in a first direction; (b) obtaining first image data representing the original image in a run-length format which includes an arrangement of run-length data representing respective image regions on each processing line in the first parallel array, each of the run-length data having a run-length value and a color code; (c) selecting one processing line from the first parallel array of processing lines; (d) serially selecting an objective image region from the image regions on the one processing line; and (e) comparing a run-length value of the objective image region with a predetermined reference value.

If the run-length value of the objective image region is smaller than the reference value, the following steps are executed: (f-1) modifying run-length data of the objective image region; and (f-2) modifying at least one of first and second run-length data representing first and second image regions which are adjacent to the objective image region and between which the objective image region is located on the one processing line. In this step, the first and second run-length data are modified without changing a total run-length on the one processing line.

Then, the steps (c) through (f) are repeated while serially selecting the one processing line from the first parallel array of processing lines, to thereby obtain second image data representing a modified image in which the width of the linework is substantially changed.

When the run-length of the objective image region is changed to zero, the linework is erased. On the other hand, the run-length of the objective region is reduced to a non-zero value, a thinned linework is obtained.

Furthermore, if the run-length of the objective image is increased, a thickened linework can be obtained. The present invention can be applied to any of these processes.

Accordingly, an object of the present invention is to provide a method of processing a linework in a short time period without increasing a cost.

These and other objects, features, aspects and advantages of the present invention will become more apparent from the following detailed description of the present invention when taken in conjunction with the accompanying drawings.

DESCRIPTION OF PREFERRED EMBODIMENT

A. Overall Structure and Operation

Figure 2:
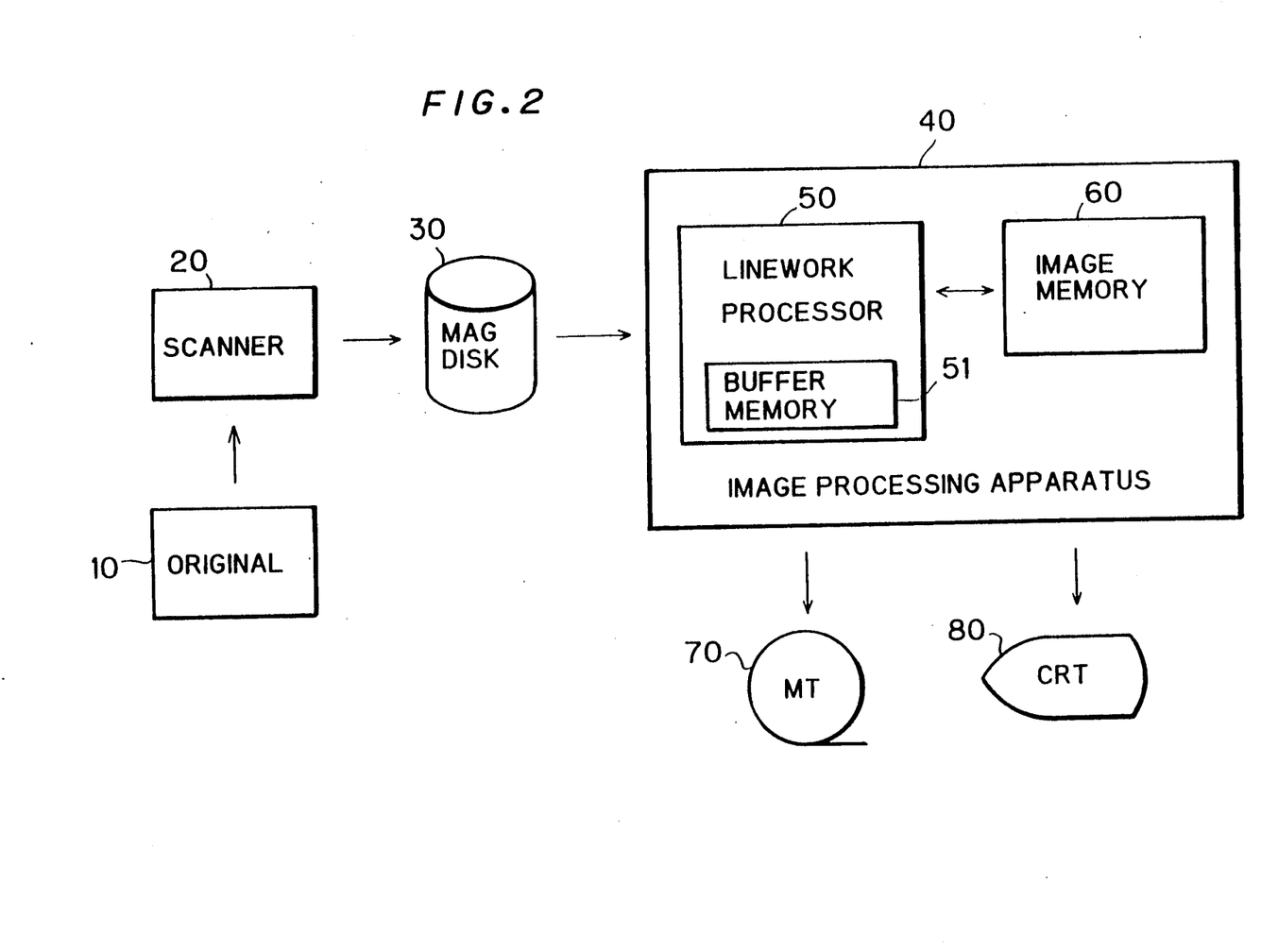
FIG. 2 is a block diagram of an linework processing apparatus in which the present invention is conducted.

FIG. 2 is an overall block diagram showing an image processing system according to a preferred embodiment of the present invention. The system comprises a scanner 20 as image input means for photoelectrically reading an object image on an original 10 through two-dimensional scanning thereof. The image data obtained by the scanner 20 is temporarily stored in a storage medium 30 such as a magnetic tape, and then delivered to an image processing apparatus 40. The image data is converted into a run-length format by the image processing apparatus 40 and is stored in an image memory 60.

The image processing apparatus 40 has a linework processer 50 having the function described later on. A buffer memory 51 is provided in the linework processor 50. The linework processor 50 transmits and receives various data needed for processing the linework to and from the image memory 60. The processed image data are outputted to a storage medium 70 such as a magnetic tape and the corresponding image is displayed on a CRT 80.

B. Data Format

Next, the run-length format employed in the preferred embodiment is described below.

Figure 3:
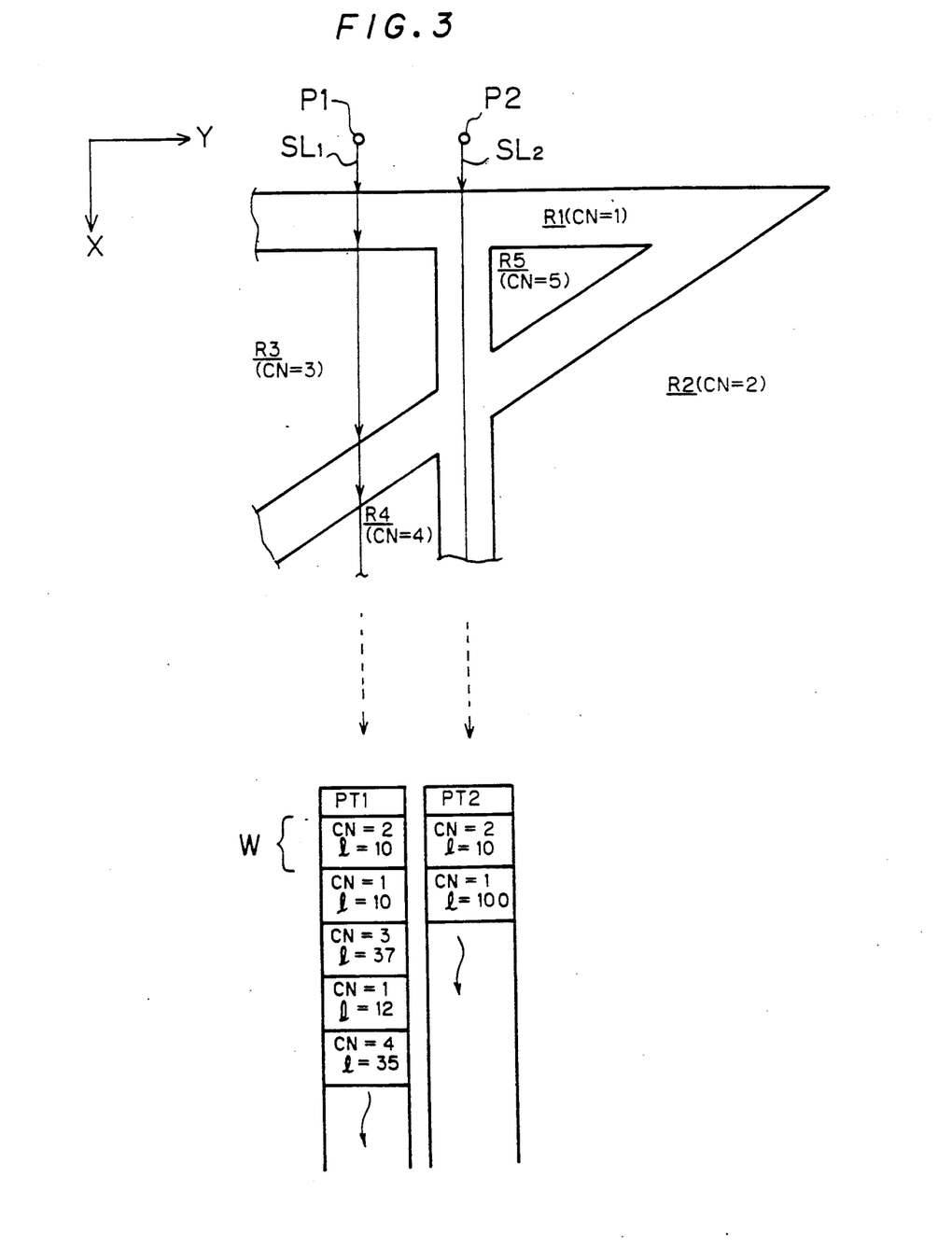
FIG. 3 illustrates an image pattern and image data converted into a run-length format.

FIG. 3 illustrates the relationship between an image pattern and image data converted into the run-length format corresponding to the image pattern. Linework regions R1 through R5 shown in the image pattern are respectively provided with color codes $CN=1$ through $CN=5$ for filling each region therewith. The color codes $CN=1$ through $CN=5$ respectively designate colors which are different from each other. A number of scanning lines $SL_1$, $SL_2$, ... are provided in parallel with a main scanning direction X. Among these scanning lines, two scanning lines $SL_1$ and $SL_2$ starting from the points P1 and P2 are shown in FIG. 3. Actually, the original image is read by the scanner 20 along each scanning line. After the image on one scanning line is fully read, the image reading process advances to a next scanning line in a subscanning direction Y to start to read the image data along the next scanning line.

The image data converted into the run-length format for the scanning lines $SL_1$ and $SL_2$ have the following respective constructions:

First, image pointers PT1 and PT2 designating the absolute coordinates of the starting points P1 and P2 are provided. Next, a series of word data W each composed of the color code CN and the run-length data l as a unit is disposed in accordance with the position and the width of those regions R1 through R5 on the scanning lines. The color codes CN designate respective colors designated for those regions R1 through R5, whereas the run-length data l designate the respective length of those regions R1 through R5 on the scanning lines. The regions R1-R5 can be obtained through a labelling process, which is disclosed in Japanese Patent Publication 1-32,547 (1989), "Computer Animation" Chap. 7, pp. 76-79, Takeshi Agui et al. (1983), published by Sampo-Syuppan Co., Ltd., Tokyo, Japan, and the like. A method of generating run-length data and color codes is disclosed in U.S. Pat. No. 4,847,689, for example. By detecting the image pointers PT1 and PT2 and by sequentially reading the following words W, those regions R1 through R5 on the scanning lines $SL_1$ and $SL_2$ can be continuously recognized. Such image data are provided for all scanning lines on an image plane, whereby the original image is represented in the run-length format. Each of the scanning lines may be provided in parallel with the subscanning direction Y, in which the image data converted into the run-length format may also be defined in the same way as the above.

The present invention is also applicable to the case where image data converted into a run-length format have combinations of color codes CN and region codes, or combinations of region codes and run-length codes.

C. Procedure of Processing Linework

Next, the procedure in the present invention method is described below. The objective linework may include ruled lines.

Figure 1A:
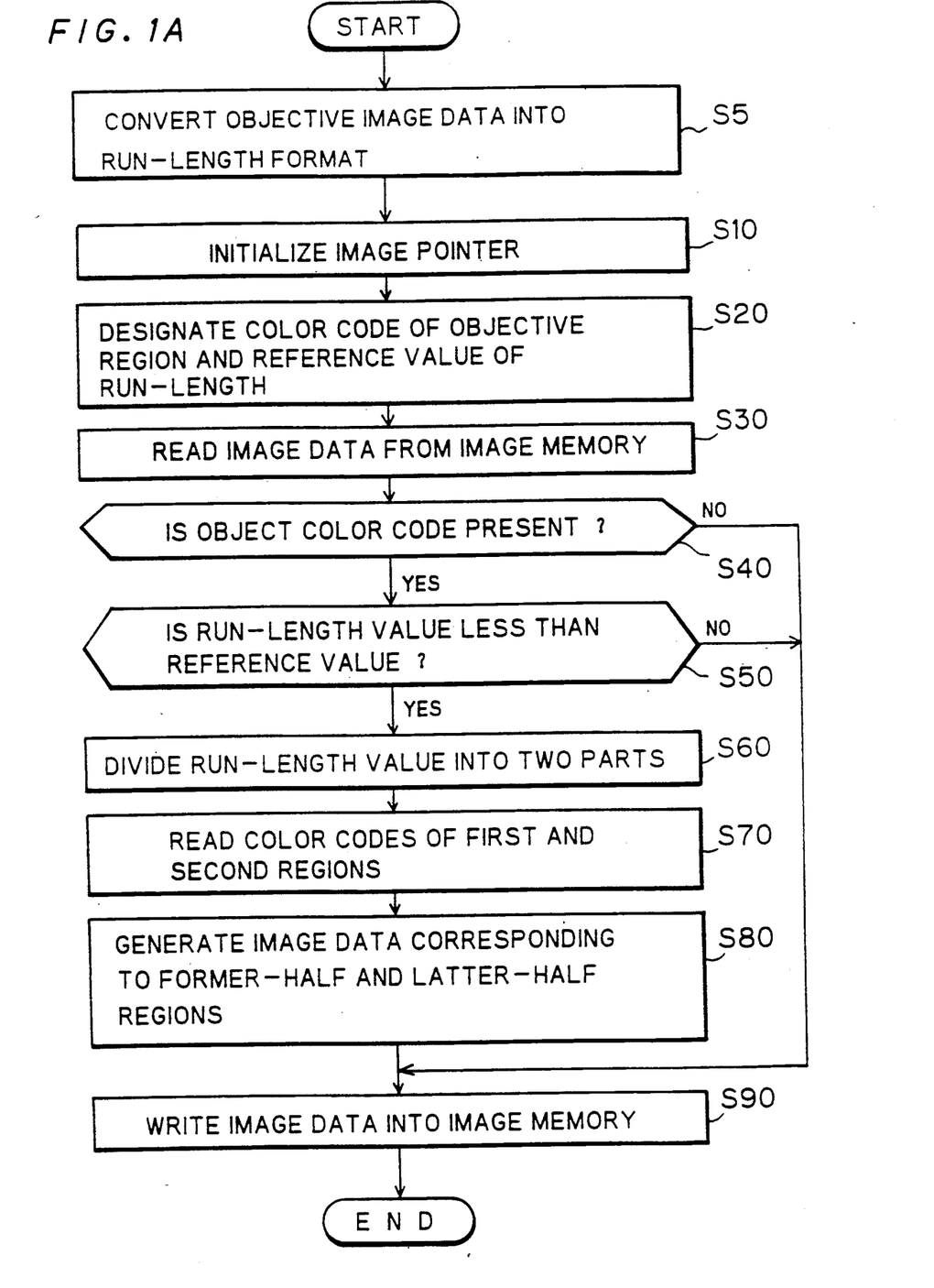
FIG. 1A is a flowchart showing a method of erasing of linework according to a preferred embodiment of the present invention.
Figure 1B:
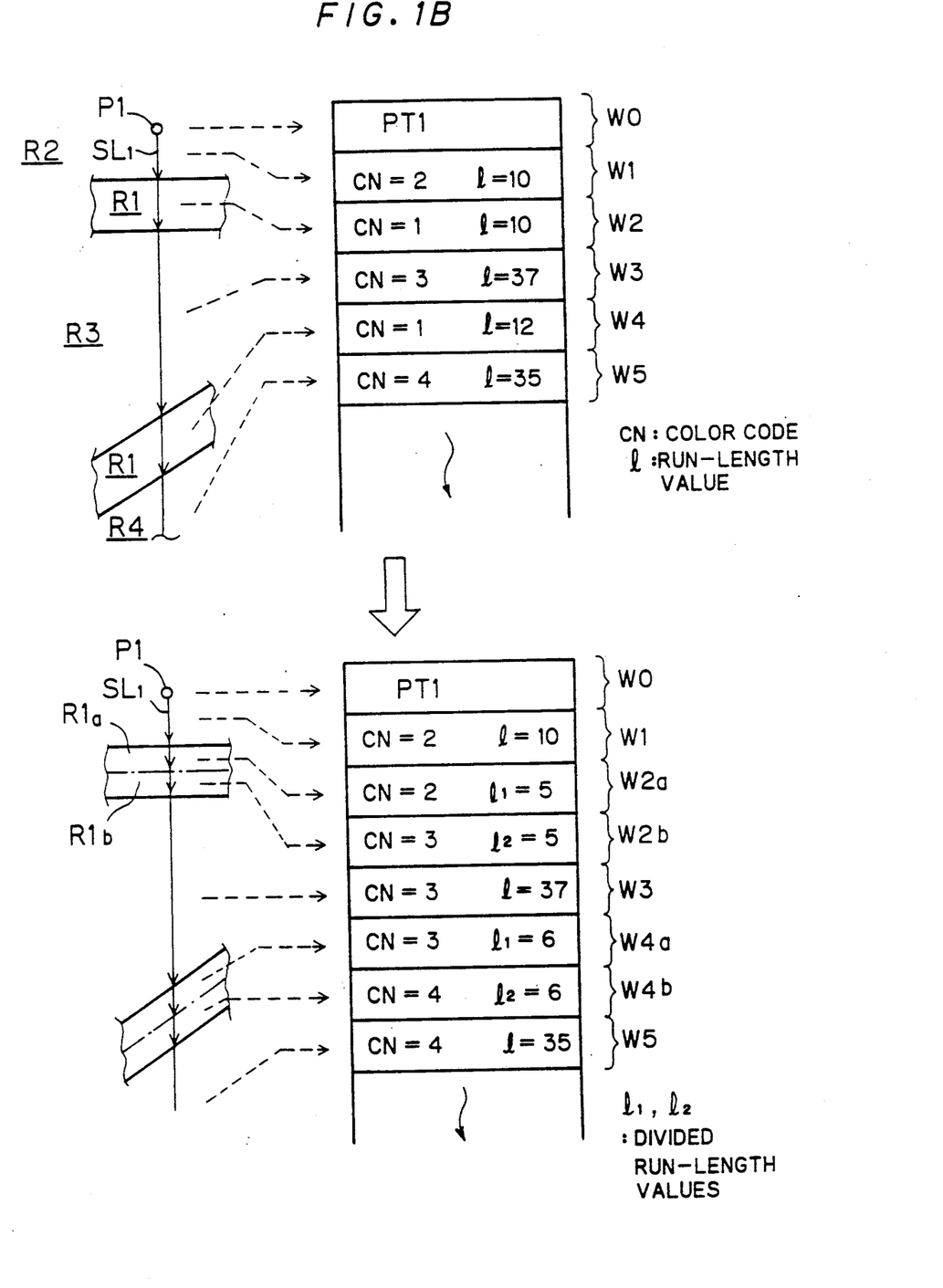
FIG. 1B illustrates modification of image data which is attained by applying the process steps shown in FIG. 1A.

FIG. 1A is a flowchart showing the linework processing operation. In the process step S5, the objective image data is converted into a run-length format through the above-mentioned process, and is stored in the image memory 60. FIG. 1B illustrates a modification of the image data obtained by conducting the process steps shown in FIG. 1A along the scanning line $SL_1$ shown in FIG. 3. The process steps are those for erasing unnecessary linework.

In the next process steps S10 shown in FIG. 1A, the image pointer is initialized, and the starting point of the scanning line is set. In the example shown in FIG. 1B, the pointer PT1 is delivered to the linework processor 50 as the first word W0 from the image memory 60 shown in FIG. 2. The point P1 and the scanning line $SL_1$ are specified through this process step.

In the next process step S20, a color code for objective regions and a reference value $l_M$ of the run-length values l are designated by an operator, where the designated color code is that of the ruled lines and the reference value $l_M$ is substantially the upper-limit value of run-length for discriminating the ruled lines to be processed from other regions. In the example shown in FIG. 1B, the color code CN=1 corresponding to the objective regions R1 and the reference value $l_M=20$ corresponding to the upper limit of the width on the scanning line $SL_1$ are respectively designated.

In the next process step S30, the buffer memory 51 which is provided in the linework processor 50 receives the image data converted into the run-length format from the image memory 60. The image data which are simultaneously stored in the buffer memory 51 may be composed of three words W corresponding to continuous three regions on a scanning line, which are minimum data needed for executing those processes described later on, and therefore, the buffer memory 51 may be of small capacity. The words W1, W2 and W3 shown in FIG. 1B are stored in the buffer memory 51 as the first continuous three words W.

In the process step S40, the processor 50 detects whether the objective color code CN is included or not in the intermediate one of the three words stored in the buffer memory 51. If the intermediate word includes the objective color code CN, the process proceeds to the next process step S50. If the same is absent, the process directly proceeds to step S90 without performing the process steps S60-S80. In the example shown in FIG. 1B, since the intermediate word W2 has the color code CN=1, the process proceeds to the step S50.

In the process step S50, the processor 50 reads the run-length value l included in the word W having the objective color code CN=1, and then compares the run-length value l with the reference value $l_M$ which was designated in the process step S20. If the run-length value l is smaller than the reference value $l_M$, the region corresponding thereto is regarded as an objective ruled line and the process proceeds to the step S60. On the other hand, if the value l is equal to or larger than the reference value $l_M$, the process steps S60-S80 are by-passed. In the example shown in FIG. 1B, since the run-length value l=10 is smaller than the reference value $l_M$, the process proceeds to S60.

In the process step S60, the processor 50 reads the run-length value l of the objective region and then divides the same into first and second run-length $l_1$ and $l_2$ under the condition that $l=l_1+l_2$. In accordance with this division, the objective region is divided into the former-half region and the latter-half region. In the example shown in FIG. 1B, the run-length value l=10 of the word W2 is divided into the first run-length value $l_1=5$ and the second run-length value $l_2=5$ so that the relationship $l_1=l_2=1/2$ is satisfied. In correspondence with the first run-length value $l_1=5$ and the second run-length value $l_2=5$, the region R1 is divided into the former-half region R1a and the latter-half region R1b. The divided run-length values $l_1$ and $l_2$ may be different from each other. Either of these values may be zero.

In the process step S70, the processor 50 reads the color codes CN of first and second regions which are present just before and just behind the objective region, respectively, and then replaces the color codes of the divided regions with those of the first and the second regions, respectively. In the example shown in FIG. 1B, the processor 50 reads the color codes CN=2 and CN=3 of the words W1 and W3 corresponding to those regions R2 and R3 before and behind the word W3, and then replaces the color codes CN=1 of the former-half region R1a and the latter-half regions R1b with the color codes CN=2 and CN=3 of the regions R2 and R3, respectively.

In the process step S80, the processor 50 generates image data corresponding to the former-half region by combining the first divided run-length $l_1$ with the color code CN of the first region, which are obtained in the process steps S60 and S70, respectively. Similarly, image data for the latter-half region is generated by combining the second divided run-length $l_2$ with the color code CN of the second region. In the example shown in FIG. 1B, the processor 50 generates a word W2a (CN=2 and $l_1=5$) corresponding to the former-half region R1a by combining the first divided run-length value $l_1=5$ with the color code CN=2 of the word W1, and further generates a word W2b (CN=3 and $l_2=5$) corresponding to the latter-half region R1b by combing the second divided run-length value $l_2=5$ with the color code CN=3 of the word W3.

In the next process step S90, the image data generated through the process step S80 are written in another area of the image memory 60. The original image data which are not subjected to the process steps S60-S80 due to the branching of the steps S40 and S50 are also written in the image memory 60. In the example shown in FIG. 1B, the newly generated words W2a and W2b are written into the image memory 60 in place of the word W2. Since the words W1 and W3 are not subject to the process step S60-S80, the original image data is again written into the image memory 60 as the words W1 and W3. These image data may be written another image memory (not shown) in place of the image memory 60. In both cases, the original image data are conserved in the image memory 60.

After the process for three continuous words W is completed, the first word is erased from the buffer memory 51 in the linework processor 50, and the fourth word W is read from the image memory 60. The data renewal process is repeated until another objective region appears in the buffer memory 51. In the example shown in FIG. 1B, the word W1 is erased, and then the new word W4 is written into the buffer memory 51. Although the word W4 is one of the objective regions, since the image data in those regions before and behind the words W4 are not stored in the buffer memory 51, the processor 50 further reads the word W5 from the image memory 60, and then executes the process steps S60 through S80 for the words W3 through W5. As was done for processing the word W2, the word W4 is divided into words W4a and W4b, which are then written into the image memory 51 in the process step S90. If the initial region containing the starting point is one of the objective regions, the processor 50 does not divide the run-length value. In this case, the color code of the initial region is replaced with the color code CN of the next region.

After the process on the scanning line SL1 is completed, the pointer is renewed and the process proceeds to the next scanning line. The process is repeated for all the scanning lines which are parallel to the main scanning direction X, whereby the whole of the image plane is processed.

Even after the whole of the image plane is processed along the scanning lines each extending in the main scanning direction X, the region R1 extending on the scanning line SL2 shown in FIG. 3 in not erased, for example, since the run-length value l thereof in the main scanning direction X exceeds the reference value $l_M$. In order to erase the region having the color code CN=1 in which the run-length value in the main scanning direction X is larger than the reference value $l_M$ but the run-length value in the subscanning direction Y is smaller than the reference value $l_M$, the image data after subjected to the processing in the main scanning direction X are converted into a bit-map format for example, and the image data is converted into the run-length format in the subscanning direction Y. Then, as was done in the main scanning direction X, the process shown in FIG. 1A is executed on respective scanning lines extending in the subscanning direction Y until the image plane is fully scanned again. The process in the subscanning direction Y corresponds to a process in the main scanning direction X for an image generated by rotating the image plane by (−90°).

Figure 4A:
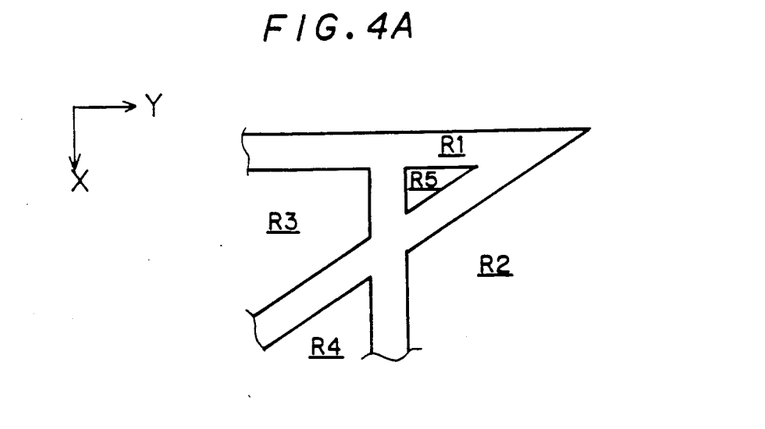
FIGS. 4A through 4C illustrate a sequence of image modifications which is obtained by applying the preferred embodiment to an image pattern.
Figure 4B:
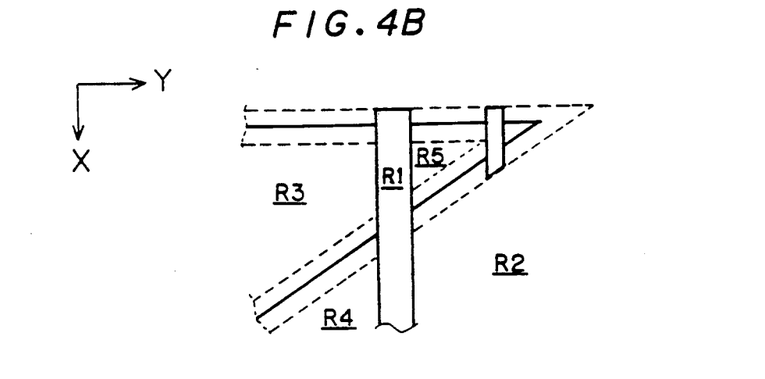
Figure 4C:
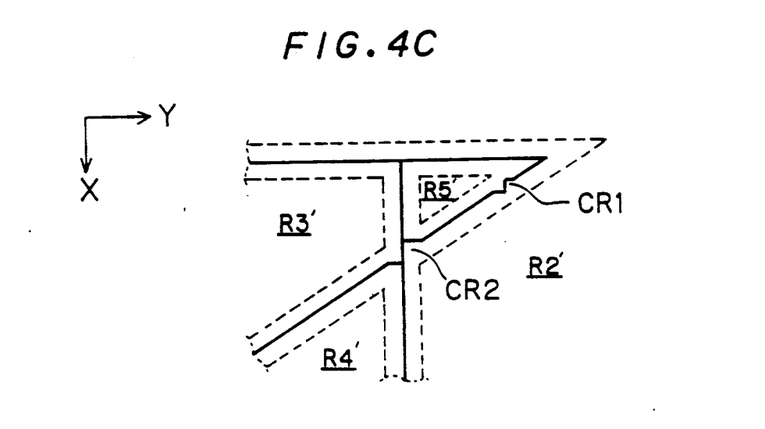

FIG. 4A is a reduced diagram of the image pattern shown in FIG. 3. FIG. 4B illustrates an image pattern which is obtained by processing the image pattern shown in FIG. 4A in the main scanning direction X, while FIG. 4C illustrates an image pattern obtained by processing the image pattern shown in FIG. 4B in the subscanning direction Y.

As shown in FIG. 4B, part of the region R1 shown in FIG. 4A is erased by the process executed in the main scanning direction X. The remaining part of the region R1 shown in FIG. 4B is also erased by the process performed in the subscanning direction Y as shown in FIG. 4C. As shown in FIG. 4C, new regions R2' through R5' are generated, which are the result of extending the regions R2 through R5 shown in FIG. 4A to the region R1. The erasing process may be alternately and repeatedly performed in the main and subscanning directions X and Y for erasing the crossing portion of the region R1. In this case, the boundary appearing at this portion may have steps like the crossing portions CR1 and CR2 shown in FIG. 4C. Nevertheless, since the width of the objective region R1 is quite narrow, and yet, since those steps of the crossing portions CR1 and CR2 are narrower than the width of the region R1, there is no problem in the visual observation.

Figure 5A:
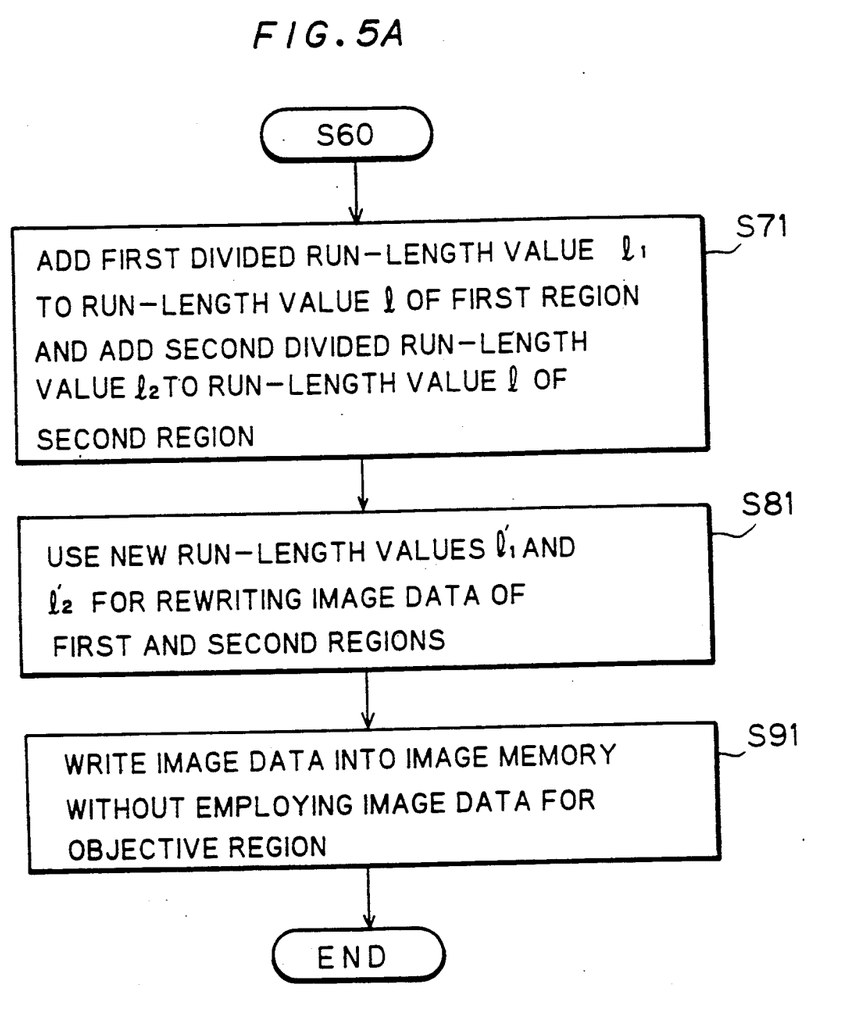
FIG. 5A is a flowchart showing a modification of the process shown in FIG. 1A.

FIG. 5A is a flowchart showing a modification of the process shown in FIG. 1A. The process steps S10 through S60 shown in FIG. 1A are also applied to this modified process, but the process steps S71–S91 are employed in place of the process steps S70–S90. In the process step S71, the first divided run-length value $l_1$ is added to the first region run-length value l proceding the objective region, whereby the run-length value $l'(=l+l_1)$ is calculated. Similarly, the second divided run-length value $l_2$ is added to the second region run-length value l following the objective region, whereby the run-length value $l_2'(=l+l_2)$ is calculated.

In the next process step S91, those run-length values $l_1'$ and $l_2'$ generated in step S71 are respectively employed as new run-length values l of the first and second regions and the old run-length of the first and second regions are replaced with the new run-length.

In the process step S91, while deleting the image data of the objective borderline region, the processor 50 writes the new image data of the first and second regions into an image memory other than the image memory 60. It is also possible to write the new image data into the image memory 60 by changing the run-length value l of the regions before and behind the objective region while deleting the image data of the objective borderline region. In this case, although the original image data are not conserved, required capacity of the image memory 60 can be reduced.

Figure 5B:
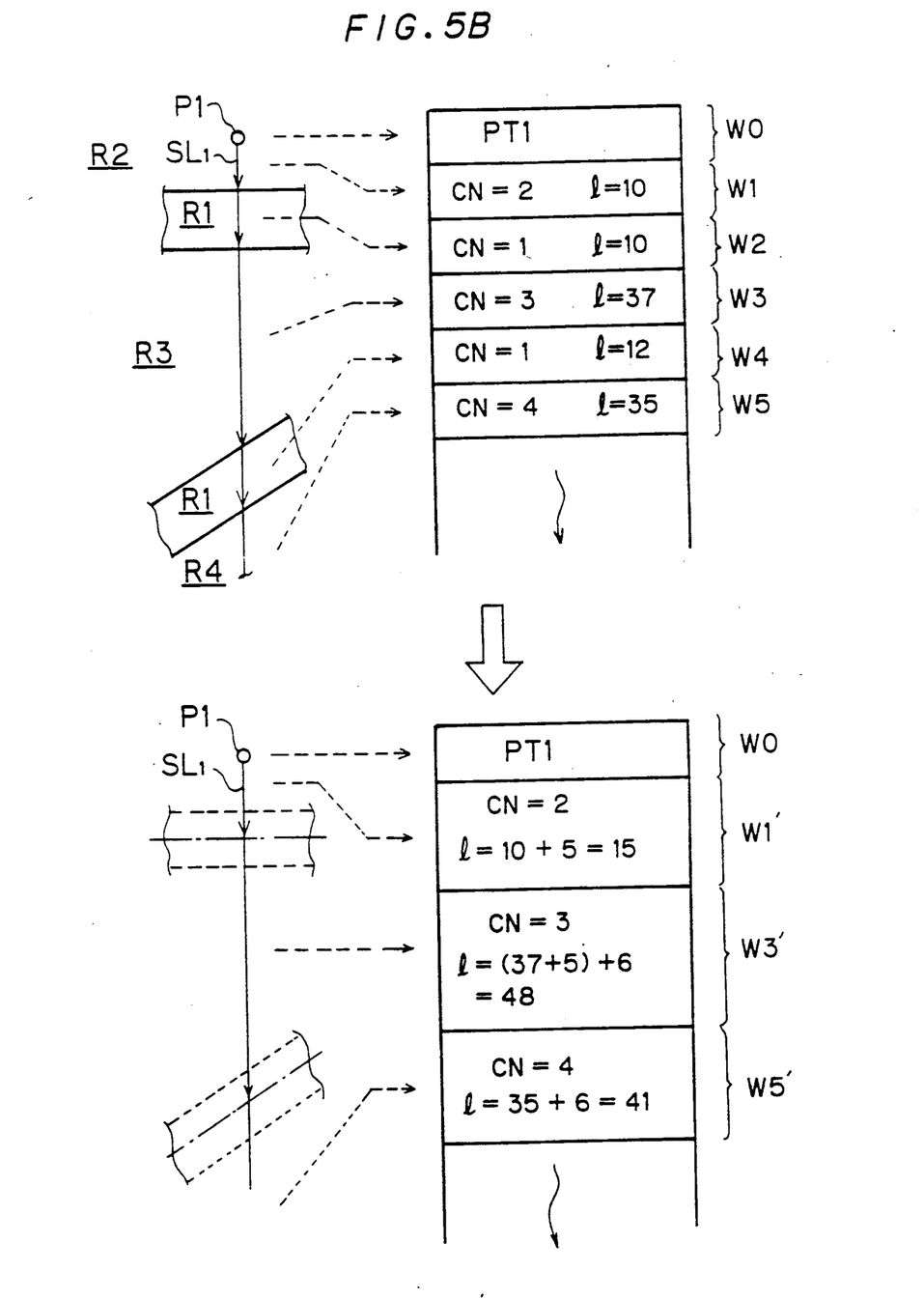
FIG. 5B illustrates an image data modification obtained by conducting the process shown in FIG. 5A.

FIG. 5B illustrates the modification of the image data which is obtained by executing the process shown in FIG. 5A along the scanning line $SL_1$ shown in FIG. 3. The process steps S10 through S60 shown in FIG. 1A are also applied to the process of FIG. 5A, and thus, the rule of renewing image data other than the borderline region and its adjacent regions is common to FIG. 1B and FIG. 5B, although such a renewal is not shown. In the example shown in FIG. 5B, the run-length value l=10 of the word W2 is divided into the first and second run-length values $l_1=5$ and $l_2=5$. In the process step S71, the first run-length value $l_1=5$ is added to the run-length value l=10 of the word W1 corresponding to the first region so that the new run-length value $l_1'=10+5=15$ is generated. In the process step S81, the word W1 in the memory is replaced with the new word W1' (CN=2 and l=15).

Another run-length value $l_2'=37+5$ is generated by applying the same process as the above to the word W3. Since another run-length is further added to that of the word W3 when the word W4 is divided, the word W3' (CN=3 and l=48) is obtained.

Execution of the whole process is completed when the new image data generated by those process steps mentioned above are written into the image memory.

After being divided into two parts, those words W2 and W4 corresponding to the objective borderline region R1 are no longer necessary, and thus, these words W2 and W4 are deleted from a series of new image data.

Since the process mentioned above is performed on respective scanning lines in the main scanning direction X and the subscanning direction Y, as is executed in the process in FIG. 1A, the obtained image is common to these two types of process.

D. Other Preferred Embodiments

Next, examples of applying the present invention to thinning and thickening processes other than the erasure of linework are described below. The thinning and thickening processes are respectively obtained by varying part of the erasure process mentioned above.

Figure 6A:
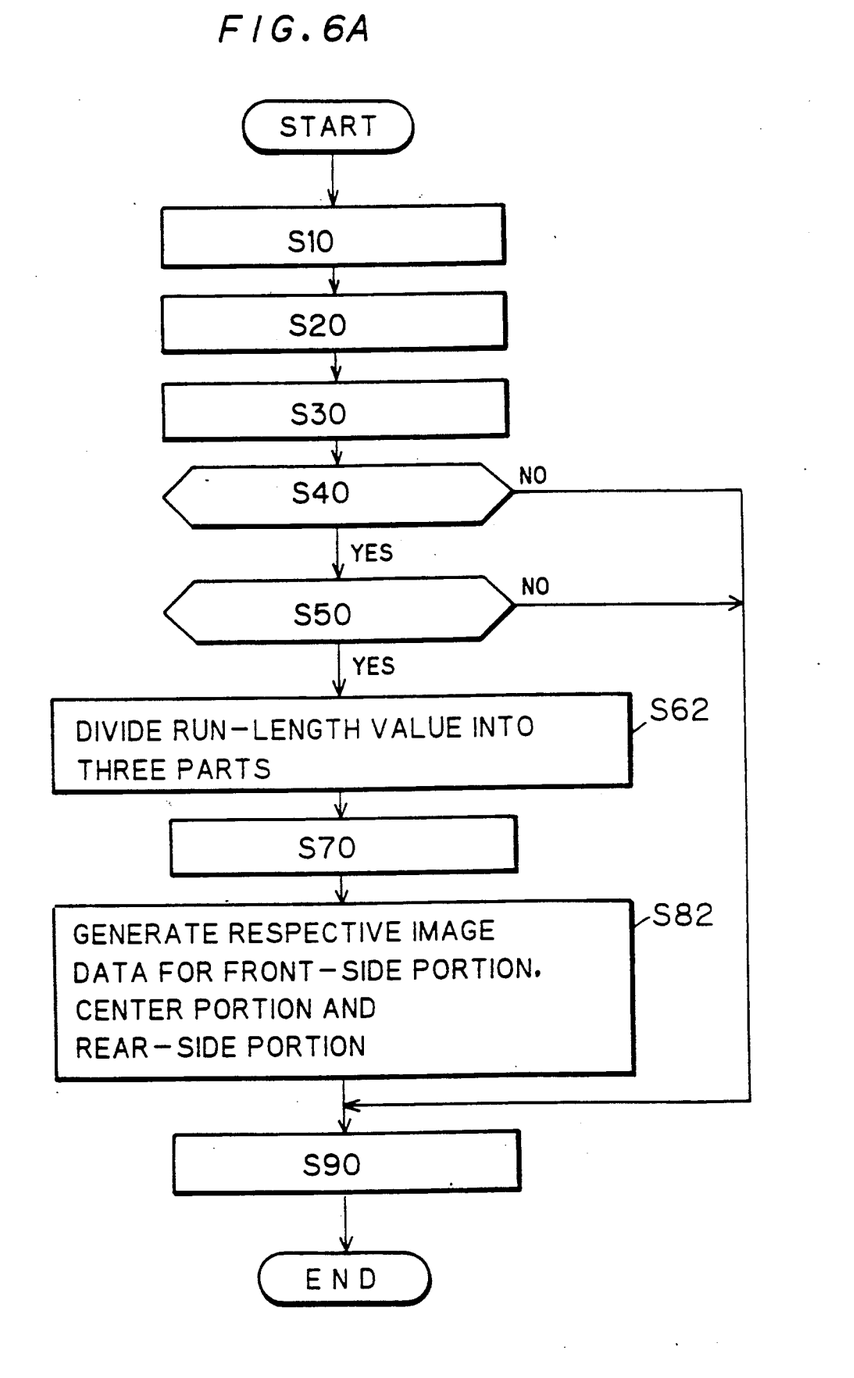
FIG. 6A is a flowchart showing a method of processing a linework according to another preferred embodiment of the present invention.

FIG. 6A flowchart showing a procedure of performing the linework processing operation according to another preferred embodiment of the present invention, which is available for thinning the linework. As is executed in the steps S10 through S50 shown in FIG. 1A, the processor 50 according to this embodiment sequentially performs the conversion of image data into the run-length format, determines image pointers and scanned lines, and recognizes presence or absence of an objective region.

In the process step S62 of FIG. 6A, the processor 50 divides the run-length value l of the objective borderline region found in the step S50 into three parts to calculate divided run-length values $l_A$, $l_B$, and $l_C$. The divided run-length $l_A$, $l_B$ and $l_C$ are assigned to a front-side portion, a center portion, and a rear-side portion of the objective borderline region, respectively. The "front-side portion" is a portion located nearer to the starting point, while the "rear-side portion" is a portion father from the starting point. These divided run-length values $l_A$, $l_B$, and $l_C$ may be different from each other. Either of the divided run-length values $l_A$ and $l_C$ may be zero.

In the process step S70, as is executed in the process step S70 shown in FIG. 1A, the processor 50 reads the color code CN of the first region preceding the objective borderline region and the color code CN of the second region following the objective borderline region.

In the next process step S82, the processor 50 generates image data for the front-side portion by combining the divided run-length value $l_A$ with the color code CN of the first region. The processor 50 also generates image data for the rear-side portion by combining the run-length value $l_C$ with the color code CN of the second region, and further generates image data for the center portion by combining the divided run-length value $l_B$ with the original color code CN of the objective borderline region. In consequence, the objective borderline region is thinned and reduced to the center portion.

In the process step S90, as is executed in the process step S90 shown in FIG. 1A, the processor 50 writes the newly generated image data into the image memory 60. Also, like the case shown in FIG. 1A, the processor 50 repeats the process in the main and subscanning directions X and Y, whereby the process for the whole image plane is executed.

Figure 6B:
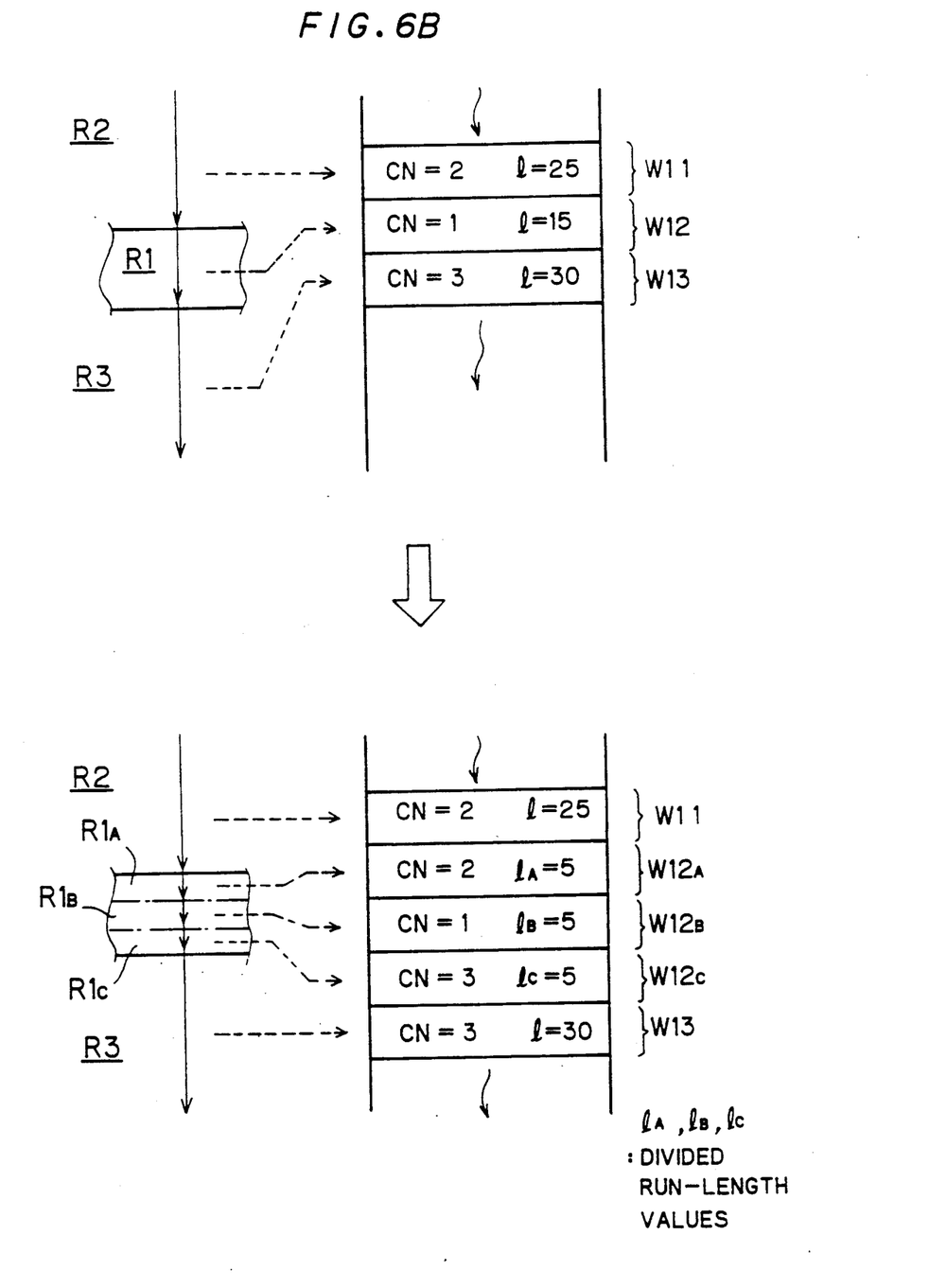
FIG. 6B illustrates an image data modification obtained by conducting the process shown in FIG. 6A.

FIG. 6B illustrates the modification of the image data when the process shown in FIG. 6A is executed. The processor 50 divides the run-length value $l=15$ of the word W12 corresponding to the objective borderline region into three portions having $l_A=5$, $l_B=5$, and $l_C=5$. Next, the processor 50 generates the word W12$_A$ (CN=2 and $l_A=5$) corresponding to the front-side portion R1$_A$, the word W12$_C$ (CN=3 and $l_C=5$) corresponding to the rear-side portion R1$_C$, and the word W12$_B$ (CN=5 and $l_B=5$) corresponding to the center portion R1$_B$, by employing the color code CN=2 of the word W11 corresponding to the first region R2, the color code CN=3 of the word W13 corresponding to the second region R3, and the original color code CN=1 of the objective region R1, respectively.

Since the center portion R1$_B$ is provided with the original color code CN=1 of the objective region R1, the objective region R1 is thinned and reduced to the center portion R1$_B$. In other words, the linework can be thinned by executing the process mentioned above. Therefore, it is possible to reduce a borderline to an inconspicuous width without perfectly erasing the same.

Figure 7A:
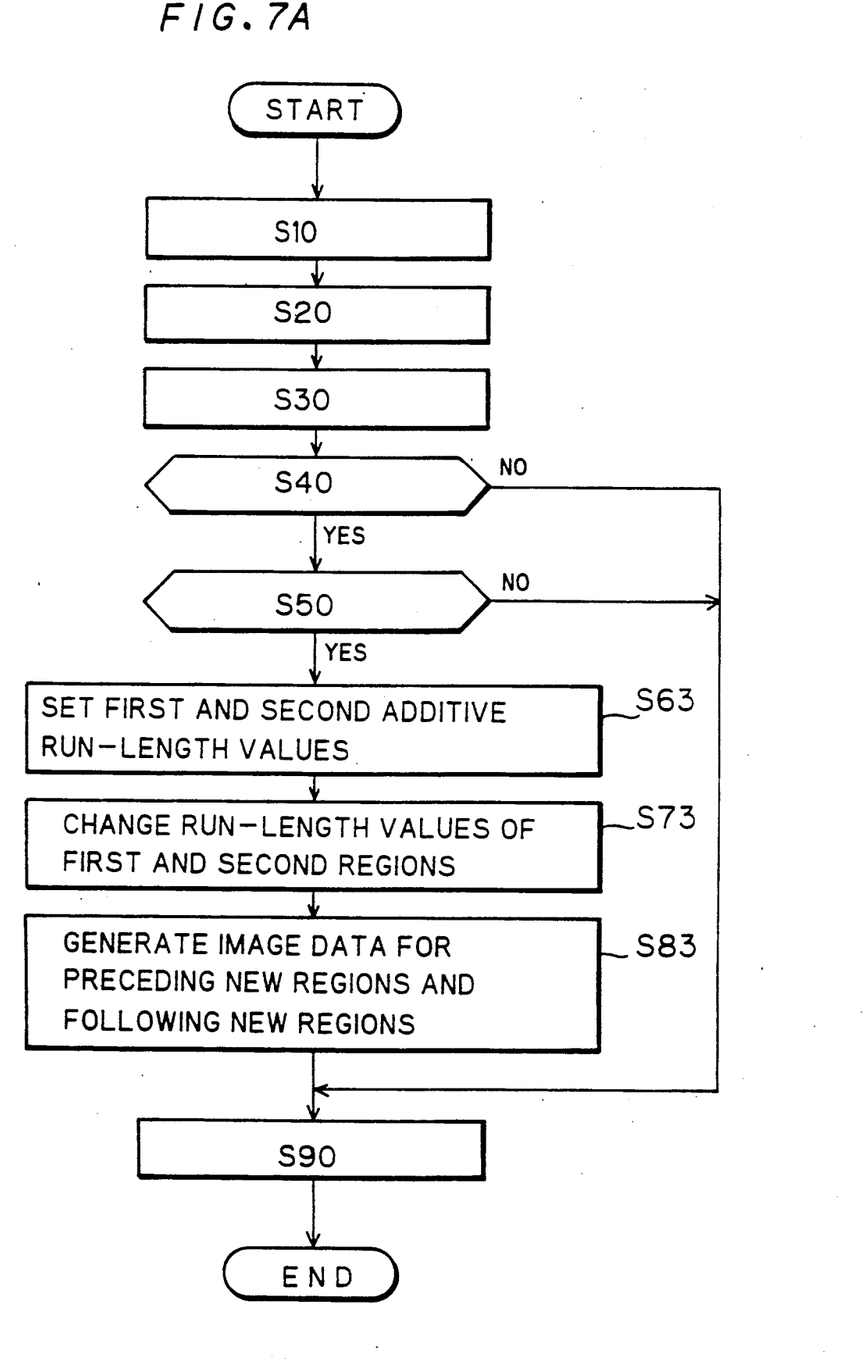
FIG. 7A is a flowchart showing a method of processing a linework according to another preferred embodiment of the present invention.

FIG. 7A is a flowchart showing a process of thickening a linework according to another preferred embodiment of the present invention.

As is executed in the process steps S10 through S50 shown in FIG. 1A, sequentially executed in this embodiment are the conversion of image data into the run-length format, determination of image pointers and scanning lines, and recognition of presence or absence of an objective region.

In the process step S63, the processor 50 sets first and second additive run-length values $l_P$ and $l_F$ which are to be added to the regions located in the front and the back of the objective region. Predetermined values may be used for the additive run-length values $l_P$ and $l_F$, or these additive run-length values may be so determined that the width of the thickened objective region comes to a predetermined width. These additive run-length values may be different from each other, and either of these values may be zero.

In the process step S73, the processor 50 reads the run-length values l of the first region preceding the objective region and the second region following the objective region, and then substracts the first and second additive run-length values $l_P$ and $l_F$ therefrom to change the run-length values of the first and second regions.

In the next process step S83, the processor 50 generates image data for preceding and following new regions by combining the first and second additive run-length values $l_P$ and $l_F$ with the color code CN of the objective region, respectively. Since the preceding new reion and the following new region are respectively provided with the color code identical to the color code of the objective region, when combining the preceding and following new regions with the original objective region, a thickened original region is obtained.

Next, in the process step S90, as is executed in the process step S90 shown in FIG. 1A, the processor 50 writes the newly generated image data into the image memory 60. Like the example shown in FIG. 1A, the processor 50 repeatedly executes the process in the main and subscanning directions X and Y, to thereby complete the process for the whole image plane.

Figure 7B:
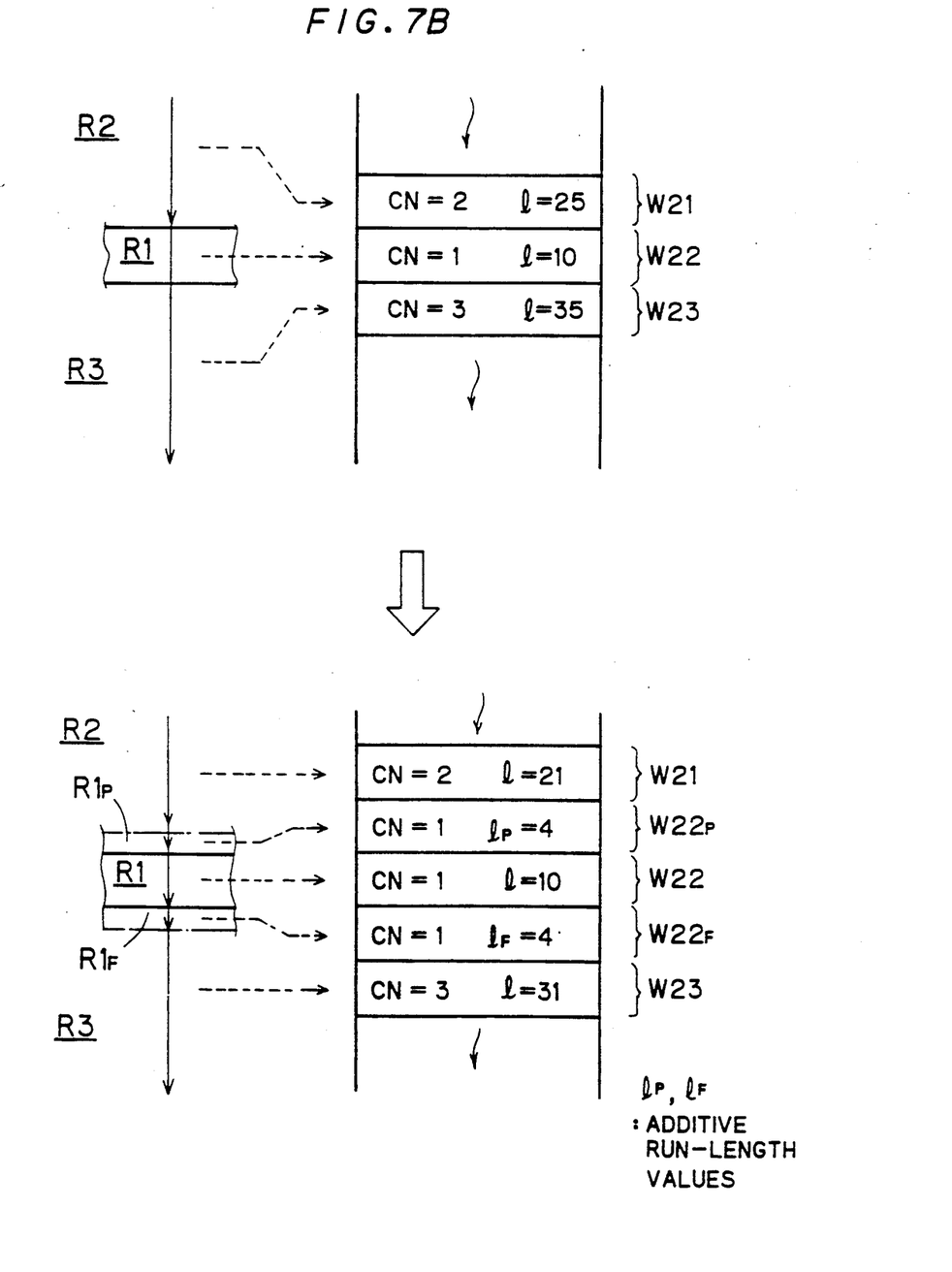
FIG. 7B illustrates an image data modification obtained by conducting the process shown in FIG. 7A.

FIG. 7B illustrates the modification of the image data obtained through the process shown in FIG. 7A. In addition to the run-length value $l=10$ of the word W2 corresponding to the objective region, the processor 50 sets the first and second additive run-length values $l_P=4$ and $l_F=4$, respectively. Next, the processor 50 substracts these additive run-length values $l_P=4$ and $l_F=4$ from the run-length value $l=25$ of the word W21 corresponding to the first region R2 and from the run-length value $l=35$ of the word W23 corresponding to the second region R3, to thereby change the respective run-length values in the words W21 and W23 to the run-length values $l=21$ and $l=31$, respectively.

The processor 50 also generates a word W22$_P$ (CN=1 and $l_P=4$) corresponding to the preceding new region R1$_P$ and the word W22$_F$ (CN=1 and $l_F=4$) corresponding to a following new region R1$_F$ by combining the first and second additive run-length values $l_P=4$ and $l_F=4$ with the color code CN=1 of the objective region R1, respectively. Since the preceding new region R1$_P$ and the following new region R1$_F$ are respectively provided with the color code CN=1, when combining the preceding new region R1$_P$ and the following new region R1$_F$ with the original borderline region R1, a thickened borderline region can be obtained.

This embodiment may be modified in order to apply the same to a process for printing, as follows: After thickening the borderline region by executing the thickening process described above, the image data of the thickened borderline region used together with the original image data of the first and second regions rather than the subtracted image data. Through this process step, obtained is a set of image data representing an image in which the thickened borderline partially overlaps the first and second regions. By virtue of this arrangment, even if there is a positional deviation between respective color blocks, there appears no blank region on printed color images.

As mentioned above, the present invention is also applied to the processes of thinning and thickening the borderline in addition to the erasure of these borderlines. Accordingly, the present invention is effective in various processings of a linework.

In conclusion, the run-length of a linework region is compared with a predetermined reference value, and if the run-length value is smaller than the predetermined reference value, the width of the linework region is changed. Tracing of a closed loop is not required, and therefore, the linework can be processed in an extremely short period of time at minimum cost.

Although the present invention has been described and illustrated in detail, it is clearly understood that the same is by way of illustration and example only and is not to be taken by way of limitation. The spirit and scope of the present invention should be limited only by the terms of the appended claims.

We claim:

1. A method of changing a width of a linework which is included in an original image, said width of said linework having a non-zero value, said method comprising the steps of:
   (a) defining a first parallel array of processing lines on said original image each of which extends in a first direction;
   (b) obtaining first image data representing said original image in a run-length format which includes an arrangement of run-length data representing respective image regions on each processing line in said first parallel array, each of said run-length data having a run-length value and a color code;
   (c) selecting one processing line from said first parallel array of processing lines;
   (d) serially selecting an objective image region from said image regions on said one processing line;
   (e) comparing a run-length value of said objective image region with a predetermined reference value;
   (f) if said run-length value of said objective image region is smaller than said reference value, executing the steps of:
   (f-1) modifying run-length data of said objective image region; and
   (f-2) modifying at least one of first and second run-length data representing first and second image regions which are adjacent to said objective image region and between which said objective image region is located on said one processing line, said first and second run-length data being modified without changing a total run-length on said one processing line; and
   (g) repeating the steps (c) through (f) while serially selecting said one processing line from said first parallel array of processing lines, to thereby obtain second image data representing a modified image in which said width of said linework is substantially changed.

2. A method of claim 1, wherein:
the step (f-1) includes the step of:
(f-1-1) dividing said run-length value of said objective image region into first and second divided run-length values; and
the step (f-2) includes the steps of:
(f-2-1) providing color codes of said first and second image regions to said first and second divided run-length values to obtain first and second additive run-length data, respectively; and
(f-2-2) combining said first and second additive run-length data with said first and second run-length data to substantially modify said first and second run-length data, respectively.

3. A method of claim 2, wherein:
the step (f-1-1) includes the step of:
dividing said run-length value of said objective image region into halves so that said first and second divided run-length values are equal to each other.

4. A method of claim 2, wherein:
the step (f-1-1) includes the step of:
dividing said run-length value of said objective image region so that said first and second divided run-length value are different from each other.

5. A method of claim 1, wherein:
the step (f-1) includes the step of:
(f-1-1) dividing said run-length value of said objective image region into first and second divided run-length values; and
the step (f-2) includes the steps of:
(f-2-1) adding said first divided run-length value to a run-length value included in said first run-length data; and
(f-2-2) adding said second divided run-length value to a run-length value included in said second run-length data.

6. A method of claim 1, wherein:
the step (f-1) includes the steps of;
(f-1-1) dividing said run-length value of said objective image region into first, second and third divided run-length values;
(f-1-2) replacing said run-length value of said objective image region with said second divided run-length value; and
the step (f-2) includes the steps of:
(f-2-1) providing a color code of said first image region to said first divided run-length value to obtained first additive run-length data;
(f-2-2) providing a color code of said second image region to said third divided run-length value to obtained second additive run-length data; and
(f-2-3) combining said first and second additive run-length data with said first and second run-length data to substantially modify said first and second run-length data, respectively.

7. A method of claim 1, wherein:
the step (f-1) includes the steps of:
(f-1-1) dividing said run-length value of said objective image region into first, second and third divided run-length values;
(f-1-2) replacing said run-length value of said objective image region with said second divided run-length value; and
the step (f-2) includes the steps of:
(f-2-1) adding said first divided run-length value to a run-length value included in said first run-length data; and
(f-2-2) adding said second divided run-length value to a run-length value included in said second run-length data.

8. A method of claim 1, wherein:
the step (f-1) includes the steps of:
(f-1-1) generating first additive run-length data having a first additive run-length value and a color code of said objective image region;
(f-1-2) generating second additive run-length data having a second additive run-length value and said color code of said objective image data; and
(f-1-3) combing said first and second additive run-length data with said run-length data of said objective image region; and
the step (f-2) includes the steps of:
(f-2-1) substracting said first additive run-length value from a run-length value in said first run-length data; and
(f-2-2) substracting said second additive run-length value from a run-length value in said second run-length data.

9. A method of claim 8, further comprising the step of;

(h) determining said first and second additive run-length values prior to the step (f).

10. A method of claim 8, wherein:
the step (f-1) includes the step of;
determining said first and second additive run-length values so that a sum of said first and second additive run-length values and said run-length value of said objective image region on said one processing line coincides with a predetermined value.

11. A method of claim 1, further comprising the steps of:
(h) defining a second parallel array of processing lines on said modified image each of which extends in a second direction;
(i) repeating the steps (c) through (g) with respect to said modified image and said second parallel array of processing lines in place of said original image and said first parallel array to thereby obtain a further-modified image.

* * * * *